J. T. WADE.
Straw Cutter.
No. 4,780. Patented Oct. 3, 1846.
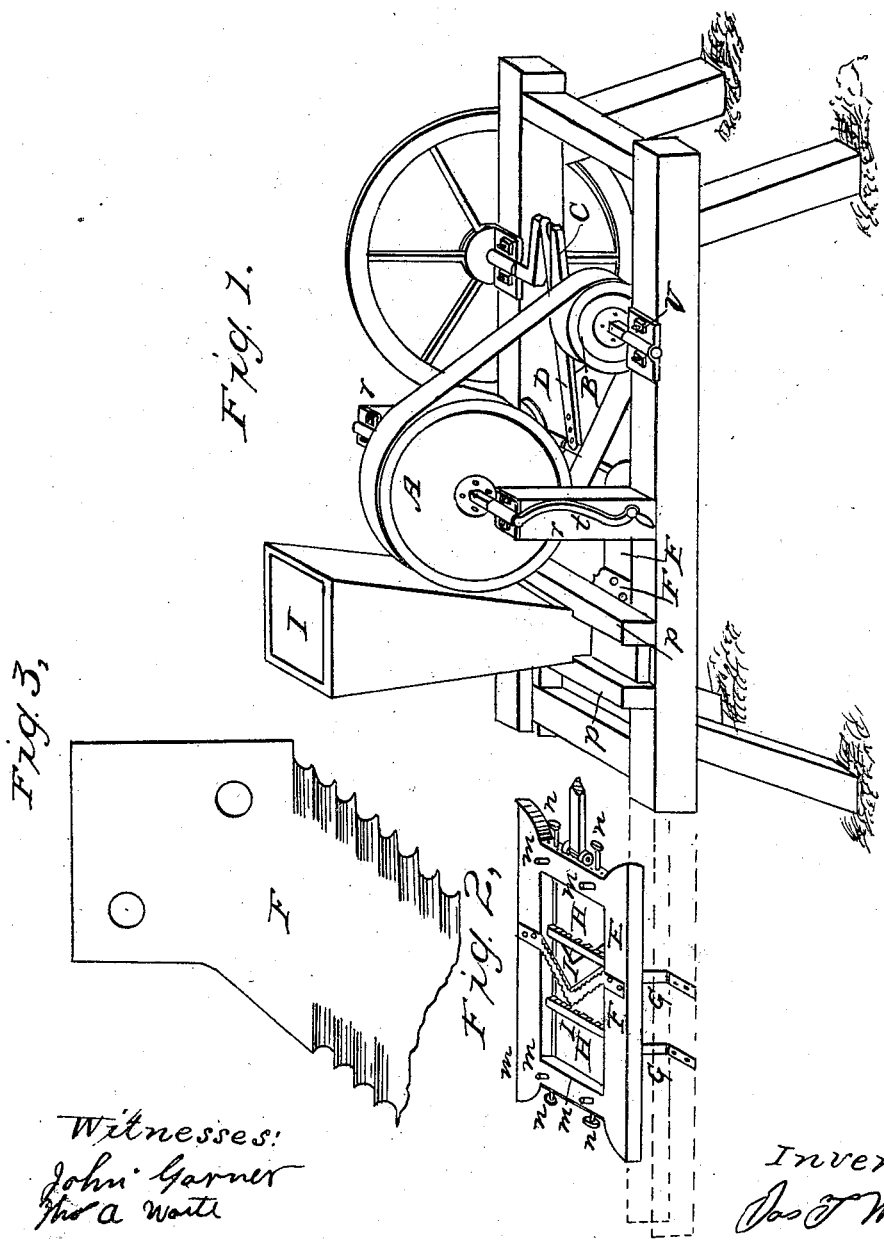

UNITED STATES PATENT OFFICE.

JAMES T. WADE, OF AUGUSTA, GEORGIA.

STRAW-CUTTER.

Specification of Letters Patent No. 4,780, dated October 3, 1846.

*To all whom it may concern:*

Be it known that I, JAMES T. WADE, of Augusta, in the county of Richmond and State of Georgia, have invented a new and Improved Self-Feeding Straw-Cutter; and I do hereby declare the following to be a full and exact description of the construction and operation of the same, reference being had to the accompanying drawings, making a part of this specification.

Figure 1, is a perspective elevation of my improved self feeding straw cutter; Fig. 2, is a perspective view of the vibrating frame and cutting blade of the same, detached; Fig. 3, is a plan of a part of a full sized cutting blade.

The same letters refer to corresponding parts in all the figures.

The supporting stand of my straw cutter is constructed of two side and two end pieces of scantling, united by tenon and mortise in the usual manner, and elevated on four legs—one at each corner.

The cutting blade F, is secured to a horizontal vibrating frame E, working in grooves formed in the side pieces of the stand. The cutting blade is of a double edged angular form, the points of the angles being in a horizontal line centrally between the sides of the vibrating frame. Both edges of the cutting blade have sharp cutting hooks formed in them, of a concave semi-circular form, the extremities of each cutting hook being in a line parallel with the ends of the vibrating frame. By this arrangement, each cutting hook acts independently, and when the blade is put in motion, each hook cuts off its own portion of the straw, the hooks on the inner side of the cutting blade do not force the straw toward the central inner angle of the same, nor do the cutting hooks on the outer side of cutting blade, force and jam the straw to the outer ends of the same, as is usually the case with angular cutters. The cutting blade is vibrated under a vertical feed box 1, in which the straw to be cut is placed; the straw rests upon gage boards H, H, placed underneath the cutting blade. The gage boards are placed at each end of the vibrating frame E; their inner ends are of an angular form, corresponding with the edges of the cutting blade; there is an opening between the inner ends of the gage boards, immediately under the cutting blade, a little broader than the same, through which the straw passes as it is cut off. The gage boards are secured to each end of the vibrating frame by bolts m, m; the heads of which are fastened to the ends of the gage boards, their shanks passing up through the ends of the vibrating frame, and are held fast, in any desired position, by the regulating screws n, n, pressing against them. The gage boards regulate the length of the straw cut by the cutting blade; when the gage boards are brought near to the blade, the straw is cut up in short pieces; when the gage boards are depressed from the cutting blade, the cuttings of stray are longer. Under each of the cross pieces p, p, which support the feed box 1, I secure adjustable brushes L, L, in an inverted position, to hinged supporters G, G, made fast to the side pieces of the stand. The supporters G, G, are secured by hinges for the purpose of giving a flexible bearing of the brushes L, L, upon the gage boards H, H. These brushes press against the gage boards, and conduct the straw as it is cut off, through the opening between them; thereby preventing the cut straw from accumulating on, and cumbering the gage boards. The vibrating frame containing the cutting knife and gage boards, is vibrated by a crank and connecting rod or pitman in the usual manner. The driving shaft s, is secured to the tops of two upright supporters r, r, framed into the side pieces of the stand.

A, is a pulley on the driving shaft connected by a band, and giving motion to the pulley B, on the crank shaft v, which is secured in bearings to the sides of the stand.

C, is the crank, and D, is the rod or pitman, connecting the same with the vibrating frame E.

K, is a fly wheel on the end of the crank shaft.

It will be perceived that the cutting blade performs two cuts at each revolution of the crank shaft, in consequence of its peculiar arrangement and its having double cutting edges. The performance of the machine is thereby doubled with but a trifling increase of power.

What I claim as my invention and desire to secure by Letters Patent, is—

The combination of the brushes (L, L,) with the gage boards, (H, H,) vibrating frame, (E,) and cutting blade (F,) substantially in the manner and for the purpose herein set forth.

JAS. T. WADE.

Witnesses:
J. W. THAYER,
Z. C. ROBBINS.